United States Patent
Duroux et al.

(10) Patent No.: US 9,380,514 B2
(45) Date of Patent: Jun. 28, 2016

(54) ROUTING OF CALLS TO SUBSCRIBERS OF OTHER MOBILE NETWORK OPERATORS

(71) Applicant: TELEFONAKTIEBOLAGET L M ERICSSON (PUBL), Stockholm (SE)

(72) Inventors: Philippe Duroux, Massy (FR); Rogerio Oliveira Ferraz, Sao Caetano Do Sul-SP (BR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 87 days.

(21) Appl. No.: 14/112,822

(22) PCT Filed: Oct. 30, 2012

(86) PCT No.: PCT/EP2012/004541
§ 371 (c)(1),
(2) Date: Oct. 18, 2013

(87) PCT Pub. No.: WO2014/067539
PCT Pub. Date: May 8, 2014

(65) Prior Publication Data
US 2015/0141022 A1 May 21, 2015

(51) Int. Cl.
*H04W 40/20* (2009.01)
*H04W 48/00* (2009.01)
*H04L 29/06* (2006.01)
*H04W 8/02* (2009.01)

(52) U.S. Cl.
CPC ........... *H04W 40/20* (2013.01); *H04L 65/1046* (2013.01); *H04W 8/02* (2013.01); *H04W 48/17* (2013.01)

(58) Field of Classification Search
CPC ........ H04W 40/20; H04W 48/17; H04W 8/02
USPC .................................................... 455/456.1
See application file for complete search history.

(56) References Cited

U.S. PATENT DOCUMENTS 6,795,444 B1* 9/2004 Vo .................... H04L 29/06027
370/401
2007/0206569 A1 9/2007 Silver et al.

OTHER PUBLICATIONS

Cheboldaeff "Interactions between a Mobile Virtual Network Operator and External Networks with regard to Service Triggering" Networking, 2007, ICN '07, Sixth International Conference in Networking, IEEE, 7 pages.
Jayasinghe et al. "Incorporating Point of Interconnect within the Australian National Broadband Network" Australasian Telecommunications Networks and Networks and Applications Conference, 2011, IEEE, 2011, 5 pages.

* cited by examiner

*Primary Examiner* — Kwasi Karikari
(74) *Attorney, Agent, or Firm* — Rothwell, Figg, Ernst & Manbeck, P.C.

(57) ABSTRACT

A method, control node, and system for routing communication calls from a first telecommunication system of a first network operator to a second telecommunication system of a second network operator, the first telecommunication system and the second telecommunication system being interconnected via at least two points of interconnect, and the points of interconnect being physically distant to each other. The method comprises the steps of receiving at the first telecommunication system a setup request associated with the communication call from an originating user equipment, determining whether a recipient of the communication call is a subscriber of the second network operator and if so, determining a geographical location of the originating user equipment, selecting a point of interconnect being closest to the geographical location of the originating user equipment, and routing the communication call from the first telecommunication system to the selected point of interconnect of the second telecommunication system.

19 Claims, 3 Drawing Sheets

ROUTING OF CALLS TO SUBSCRIBERS OF OTHER MOBILE NETWORK OPERATORS

CROSS REFERENCE TO RELATED APPLICATION(S)

This application is a 35 U.S.C. §371 National Phase Entry Application from PCT/EP2012/004541, filed Oct. 30, 2012, designating the United States, the disclosure of which is incorporated herein in its entirety by reference.

TECHNICAL FIELD

The present invention relates to routing of communication calls to subscribers serviced by other network operators, the routing being carried out by a control node.

BACKGROUND

A mobile virtual network operator, MVNO, is a wireless communications services provider that does not own the radio spectrum or wireless network infrastructure over which the MVNO provides services to its customers. Different variants of MVNOs can be distinguished. In this invention the term MVNO refers to a full MVNO, which is characterized by the fact that it runs an own telecommunication system consisting of at least a GMSC and a HLR.

The telecommunication system of a full MVNO has interconnections to a hosting network operator, HNO, which provides the radio access network and also provides the originating and terminating MSC, which is needed to originate and deliver communication calls to and from the subscribers of the full MVNO. The telecommunication system of a full MVNO has also interconnections to several other operators and to national/international carriers. A full MVNO is also characterized by the fact that all calls originating from their subscribers in a network of a HNO, are forwarded by the HNO to the telecommunication system of the MVNO for further processing and routing. So a full MVNO is always transiting the originating calls of their subscribers towards the terminating operator or a national/international carrier.

Another aspect to consider is the charging principles applied in mobile networks. The fundamental principle is that the calling party will pay for the entire communication call. The MVNO thus receives money for the calls made by its own subscribers. At the same time the MVNO has to pay fees to the HNO for hosting the MVNO's subscriber and to other operators for routing the call across an interconnect network and across a terminating network. The network terminating a call charges a termination fee to the network operator, from which the call is coming in.

For the MVNO this means that the MVNO has to pay this termination fee to the network operator it is routing calls towards.

The termination fee is variable and depends on the resources utilized in the terminating network. It is calculated based on the geographical distance from the entry point to the termination point in the network, so the MSC where the terminating subscriber is registered. So the more kilometers the terminating subscriber is away from the network entry point, the more expensive this termination fee is.

The telecommunication systems of operators are interconnected in order to enable that the subscribers of these networks can reach each other. The point where two networks are interconnected is called Point of Interconnect, POI. In practical realizations several POIs exist between each two telecommunication systems, and the POIs are geographically distributed. This allows to load balance the traffic between two telecommunication systems, but also to influence the termination fee. When there is a choice, it is cheaper to route a call via the POI as close as possible to the geographical location of the terminating subscriber.

For calls terminating to subscribers belonging to the MVNO, the geographical location of the terminating subscriber can easily be determined by analyzing in the GMSC of the MVNO the Mobile Station Roaming Number, MSRN. Since the MSRN is allocated by the terminating MSC, it reveals the geographical position of the MSC, and routing in the GMSC can be optimized by selecting the POI closest to this geographical location.

However, since a full MVNO is acting as transit for all calls of his subscribers, there are situations where the MVNO cannot determine the geographical location. This is the case for all calls to mobile subscribers that are serviced by other network operators. The MVNO transits these calls to the GMSC of the network operator servicing the subscriber. In this situation, the MVNO has no means to determine the geographical location of the terminating subscriber, and therefore also no way to optimize the selection of the POI and the routing. This is mainly a problem for full MVNO operators, because they do not have access to information in the radio network.

This problem also arises for call cases involving Mobile Number Portability, MNP. MNP enables mobile telephone users to retain their mobile telephone numbers when changing from one mobile network operator to another. Such users are generally denoted as ported-out subscribers. So in case of MNP were a subscriber is ported-out, ported from a donor network operator to a recipient network operator, the destination number still looks like an own subscriber number.

If a subscriber is found to be ported-out, the MVNO has to transit the communication call to the so called recipient network, the network of the recipient network operator. Also in this scenario the MVNO has no knowledge about the geographical location of the terminating subscriber, and therefore also no way to optimize the selection of the POI and the routing. Consequently, communication calls to ported-out subscribers are to be handled in the same way as calls to subscribers serviced by other network operators.

SUMMARY

In view of the above-said a need exists to improve the routing of calls to subscribers serviced by other network operators in such a way that usage of network resources is minimized, resulting in particular in minimal termination fees. The termination fee is based on the geographical distance from the entry point to the terminating network to the terminating MSC, where the terminating subscriber is registered. For subscribers serviced by other network operators and for subscribers ported-out to other network operators, there is no way to determine the geographical location of the subscriber at routing of terminating communication calls.

This invention assumes that people preferably make calls to other people in their close vicinity. The usage of network resources is statistically minimized when selecting a POI to the terminating network as close as possible to the geographical location of the originating user equipment. Assuming that in many cases the calling and the called subscriber are close to each other, the average usage of network resources and particular the average termination fee is minimized.

The need to minimize the resource usage is met by the features of the independent claims. In the dependent claims preferred embodiments of the invention are described.

According to a first aspect of the invention a method for routing communication calls from a first telecommunication system of a first network operator to a second telecommunication system of a second network operator is provided. The first telecommunication system and the second telecommunication system are interconnected via at least two points of interconnect. The points of interconnect are physically distant to each other. The method comprises in the first step receiving at the first telecommunication system a setup request associated with the communication call from an originating user equipment. In the next step it is determined whether a recipient of the communication call is a subscriber of the second network operator. If so, the geographical location of the originating user equipment is determined. Then a point of interconnect closest to the geographical location of the originating user equipment is selected. Finally, the communication call is routed from the first telecommunication system to the selected point of interconnect of the second telecommunication system.

The setup request associated with the communication call may be received from a third telecommunication system of a third network operator.

Furthermore, the determining whether the recipient of the communication call is a subscriber of the second network operator may be done by analyzing the destination address received with the setup request. If the result of the destination address analysis is that the recipient is an own subscriber, it may be determined whether the recipient is a subscriber ported-out from the first network operator to the second network operator by means of mobile number portability, MNP.

In addition the determining of a geographical location of the originating user equipment may be done based on geographical information received with the setup request.

The invention, furthermore, relates to a control node for routing a communication call from a first telecommunication system of a first network operator to a second telecommunication system of a second network operator. The first telecommunication system and the second telecommunication system are interconnected via at least two points of interconnect. The points of interconnect are physically distant to each other. The control node comprises a receiving unit adapted to receive a setup request associated with the communication call from an originating user equipment. The control node is adapted to receive information on the geographical location of the originating user equipment within this setup request. The control node further comprises at least one processing unit adapted to determine whether a recipient of the communication call is a subscriber of the second network operator. The processing unit is adapted to determine a geographical location of the originating user equipment based on the obtained information on the geographical location. The processing unit is adapted to select a point of interconnect closest to the geographical location of the originating user equipment. The control node further comprises a routing unit adapted to route the communication call from the first telecommunication system to the selected point of interconnect of the second telecommunication system.

In addition, the control node may further comprise a number analysis unit adapted to determine whether the recipient of the communication call is a subscriber of the second operator by analyzing the destination address received with the setup request.

Furthermore, the control node may further comprise an information query unit adapted to obtain information whether a recipient of the communication call is a ported-out subscriber from the first network operator to the second network operator.

The invention, furthermore, relates to a system for routing a communication call from a first telecommunication system of a first network operator to a second telecommunication system of a second network operator. The first telecommunication system and the second telecommunication system are interconnected via at least two points of interconnect. The points of interconnect are physically distant to each other. The system comprises a control node according the method described above. The system furthermore comprises a server node for mobile number portability, MNP.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Possible embodiments of the invention involve a number of telecommunication systems and network operators. A telecommunication system refers to a collection of nodes and related transport links needed for running a communication service, for example telephony. Depending on the communication service, different node types may be utilized to realize the service. A network operator owns the telecommunication system, and offers the implemented communication services to its subscribers.

The first telecommunication system of a first network operator refers to a telecommunication system belonging to a first network operator where a communication call request is received. The destination of the communication call is located in a second telecommunication system belonging to a second network operator.

Figure 1:
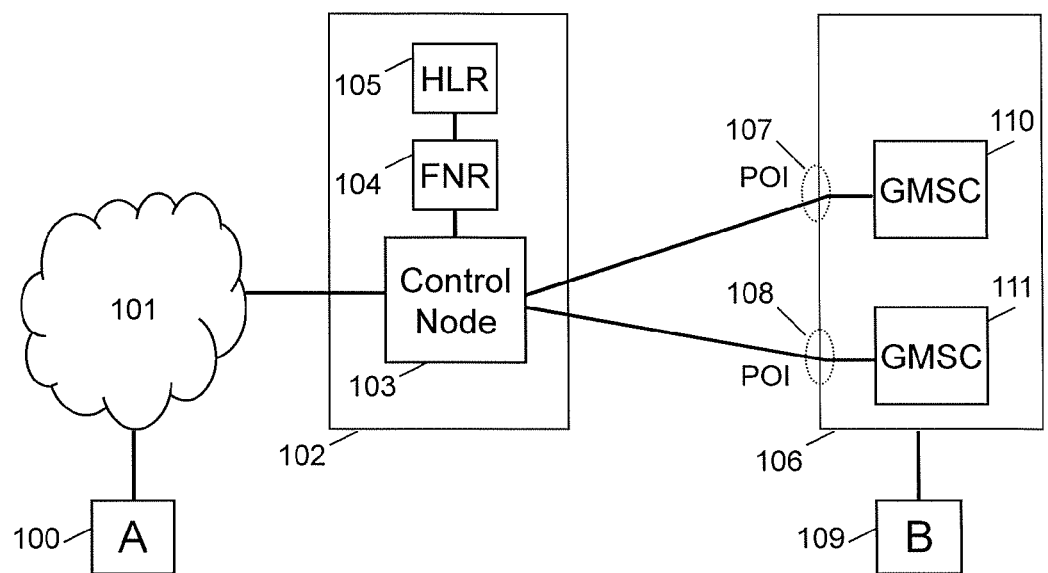
FIG. 1 shows a network scenario according to the invention.

Now, with respect to FIG. 1, an exemplary network scenario involving several telecommunication nodes is show.

The telecommunication system 102 of the first network operator comprises at least one control node 103 for controlling the routing of communication calls originating from, and/or terminating to the subscribers of the first operator, at least one home location register, HLR 105, a database holding the data of all subscribers of the first network operator, and at least one flexible number register, FNR 104, holding the information of all subscribers ported-out from the first network operator to other network operators.

The telecommunication system 102 of the first network operator is interconnected with the telecommunication systems of other networks operators, for exemplification the interconnection to a second telecommunication system 106 of a second network operator is shown. The interconnection from the first telecommunication system 102 to the second telecommunication system 106 is done via multiple POIs, for exemplification two of those POIs 107, 108 are shown.

The originating subscriber A with the user originating equipment 100 is roaming in a third telecommunication system 101 of a third network operator, here called the hosting network operator, HNO. The HNO provides the radio access network and the MSC (not shown), which is needed to originate and deliver communication calls to and from subscribers.

At the first telecommunication system 102 a setup request associated with a communication call is received from the originating subscriber A with the user originating equipment 100. The control node 103 then determines whether the recipient 109 of the communication call is a subscriber of the second network operator, for instance by analyzing the destination address received with the setup request.

If so, the control node 103 determines a geographical location of the originating user equipment 100 and selects a POI 107, 108 closest to the geographical location of the originating user equipment 100. It should be understood that the term closest refers to the fact that the chosen POI 107, 108 is best suited for a particular geographical location. The use of the chosen POI 107, 108 for the communication call in question may lead to the least network resource usage, may go via the least number of switching points, may use transport links with the least transport cost, may cost the least termination fee, may result into the shortest distance in kilometers between the geographical location of the chosen POI 107, 108 and the geographical location of the recipient B with the terminating equipment 109, or any combination hereof.

Finally the control node 103 routes the communication call from the first telecommunication system 102 to the selected POI 107, 108 of the second telecommunication system 106.

The POIs 107, 108 may be connected internally within the second telecommunication system 106 to GMSC nodes 110, 111 which take care of the further routing of mobile terminating calls to subscribers of the second network operator.

In this example, the originating subscriber A with the user originating equipment 100 is roaming in a third telecommunication system 101 of a third network operator, here called the hosting network operator, HNO. The HNO provides the radio access network and the MSC, which is needed to originate and deliver communication calls to and from subscribers. The originating subscriber A with the user originating equipment 100 is hosted by the HNO, but his subscription is with a first network operator running the first telecommunication system 102. In this example the first network operator is a full MVNO, which does not have own radio spectrum or wireless network infrastructure, except the shown first telecommunication system 102. The HNO may be any operator in the home country of the MVNO, or may be any visited network in other countries than the home country.

In this example, the setup request associated with the communication call may be received via a signalling used for setting up a circuit switched call. Examples for such signalling systems are ISUP, BICC, or SIP-I. The requested communication call may be a voice call, a data call, a multimedia call, or any combination thereof.

In this example, the determining whether the recipient B of the communication call is a subscriber of the second network operator is done by analyzing the destination address received with the setup request. As a first possibility, the recipient B has a subscription with the second network operator and is roaming within the radio coverage of this second operator. The recipient B may as well roam abroad in another visited network. In these cases the analysis result is that the recipient B of the communication call is a subscriber of the second network operator.

As another possibility, the result of the destination address analysis is that the recipient B is an own subscriber. In this case it is determined whether the recipient B is a subscriber ported-out from the first network operator to the second network operator by means of check of mobile number portability, MNP. If the recipient B is a a subscriber ported-out to the second network operator, the analysis result is that the recipient B of the communication call is a subscriber of the second network operator.

In this example, the determining whether the recipient of the communication call 109 is a ported-out subscriber is done using a flexible number register, FNR 104.

The determining a geographical location of the originating user equipment 100 is done based on geographical information received with the setup request. The geographical information of the originating user equipment 100 may for example be any of the following: a Location Number information element with the Location Number related to the originating equipment 100, GPS coordinates, positioning measurements based on triangulation, a serving radio location area, a serving radio cell area, or any combination hereof.

Figure 2:
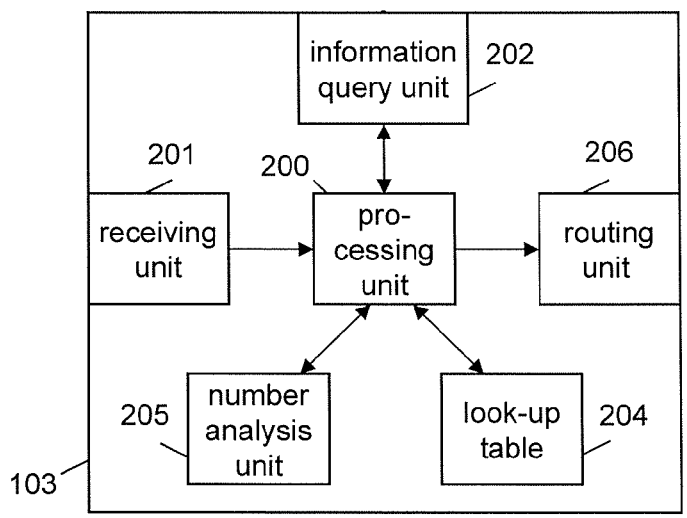
FIG. 2 shows a schematic view of a control node adapted to perform the routing according to the invention.

In this example, the selecting of the POI 107, 108 is based on a look-up table 204, as shown in FIG. 2 and explained in more detail further below. The look-up table 204 may also be a database, or may be distributed over more than one table. The look-up table stores one POI per combination of second operator and geographical location.

In this example, the telecommunication system 102 of the first network operator is directly interconnected with the second telecommunication system 106 of a second network operator. Routing of the communication setup request is done by selecting a dedicated route towards the selected POI 107, 108.

In an alternative embodiment, routing of the communication setup request is done by adding a prefix to the received recipient 109 address. A prefix may be one or more digits that are placed in front of the received recipient 109 address when routing out the communication call. The prefix is chosen depending on the selected POI. This may be the case if the first and the second telecommunication system are interconnected via a fourth telecommunication system of a fourth network operator. This fourth telecommunication system is configured to route the communication call to the POI identified by the prefix.

In this example, the control node 103 is typically a gateway MSC, GMSC or a transit switching centre, TSC, or a combination hereof.

FIG. 2 shows a schematic view of the control node 103 adapted to perform the routing described above. The control node 103 may comprise a number of functional units, which are described in further detail below.

The receiving unit 201 may be adapted to receive a setup request for a communication call from an originating subscriber A with the originating equipment 100 and may be adapted to receive information on the geographical location of the originating user equipment 100 within this request.

The geographical information of the originating user equipment 100 may for example be any of the following: a Location Number information element with the Location Number related to the originating equipment 100, GPS coordinates, positioning measurements based on triangulation, a serving radio location area, a serving radio cell area, or any combination hereof.

The originating subscriber A with the user originating equipment 100 may be roaming in a HNO in the same country as the first network operator, or may also roam in any visited network abroad. The setup request may be received via a signalling system used for setting up circuit switched communication calls. Examples for such signalling systems are ISUP, BICC, or SIP-I. The requested communication call may be a voice call, a data call, a multimedia call, or any combination thereof.

The setup request may also originate from a telecommunication system of a fixed network operator. The control node may also comprise a co-located MSC, which is described in further detail in FIG. 4.

The receiving unit 201 may pass an indication of the received call, the information on the geographical location of the originating user equipment 100, and possibly other relevant data to the processing unit 200 for further processing.

The processing unit 200 may be adapted to determine whether a recipient of the communication call, which may e.g. be the user equipment 109 of FIG. 1, is a subscriber of the second network operator, adapted to determine a geographical location of the originating user equipment 100, and adapted to select a point of interconnect 107, 108 being closest to the geographical location of the originating user equipment 100.

The processing unit 200 may receive an indication of an incoming call request from the receiving unit. Along with that, information on the geographical location of the originating user equipment is received.

Based on the destination address of the recipient B, the processing unit 200 may determine whether the recipient B is a subscriber of the second network operator. If a geographical location of the originating user equipment is not received along with the call request, the processing unit 200 may request this information from the telecommunication system 101 of the HNO.

Based on the information on the geographical location of the originating user equipment 100 the processing unit 200 may determine the geographical location of the originating user equipment 100.

Based on the geographical location of the originating user equipment 100 and the result whether the recipient B is a subscriber of the second network operator, the processing unit 200 may select the POI 107, 108 closest to the geographical location of the originating user equipment 100.

In a practical implementation the processing unit 200 may be one processor taking care of all the determination steps, or may also be distributed over more than one processor, wherein the determination steps are distributed over the available processors.

The routing unit 206 may be adapted to route the communication call from the first telecommunication system 102 to the selected POI 107, 108 of the second telecommunication system 106.

Depending on what type of interconnection is available towards the selected POI of the second telecommunication system, different approaches can be taken. The interconnection may consist of a direct route to the POI. In this case the routing unit 206 may select this direct route for further routing of the communication call.

It may also be the case that the interconnection is realized via a separate transit interconnection network provider. In this case the routing unit 206 selects a route to the transit interconnection network provider.

Also in this case the routing unit 206 may add, before routing the communication call, a prefix to the recipient B address. A prefix may be one or more digits that are placed in front of the received recipient B address when routing out the communication call. The prefix may be chosen depending on the selected POI. This prefix uniquely identifies the selected POI of the second telecommunication system. When received at the POI, the added prefix may be removed as it is not needed anymore for the further routing of the communication call to the recipient B.

In addition to the three units above, supplementary units may support the processing unit with the determination steps. These supplementary units may be integrated part of the processing unit, may be realized as separate modules in the control node 103, or be realized by functions outside the control node 103.

The own subscriber check may be realized by an analysis unit. The number analysis unit 205 is adapted to provide information whether the recipient B of the communication call is a subscriber of the second operator by analyzing the recipient B address received with the setup request. The number analysis unit 205 performs a number analysis on request from the processing unit 200. The recipient B address may be in the format of an E.164 number or a SIP URI and uniquely identify the recipient B and the second network operator serving the recipient B. The number analysis unit 205 may be configured by the first network operator by operation and maintenance means. The analysis steps performed by the number analysis unit 205 depend on the format of the address and are well known for a person skilled in the art. The result of the number analysis, so whether the recipient B is an own subscriber, or, if not, what is the serving network operator, is passed back to the processing unit 200.

The ported-out check may be realized by a query unit. The information query unit 202 is adapted to obtain information whether a given subscriber is a ported-out subscriber from the first network operator to the second network operator. The information query unit 202 performs an information query on request from the processing unit 200.

A mobile telephone user may use mobile number portability, MNP to retain his number when changing his subscription from the first operator to the second operator. In this case, the telecommunication system of the first network operator acts as a donor network, as that is porting-out one of its own numbers. The telecommunication system of the second operator acts a recipient network, as that receives the ported-out number.

Different implementation options exist to realize MNP. This embodiment utilizes a flexible number register, FNR 104. The FNR 104 may sit in the signalling path in-between the control node 103 and the HLR 105. So when the control node 103 acting for example as a GMSC interrogates the HLR 105 for routing information, the FNR 104 intercepts this query and identifies whether the destination subscriber is a ported-out subscriber.

Figure 5:
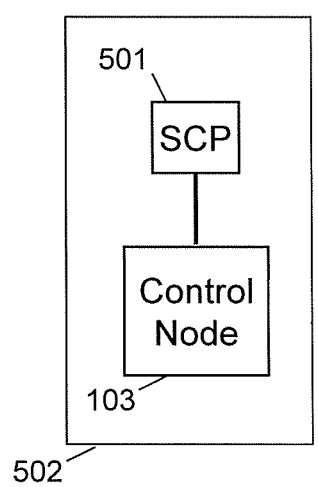
FIG. 5 shows a telecommunication system according to the invention comprising a SCP using IN or CAMEL means.

Another option to realize a MNP check is to use IN or CAMEL mechanism, which is further described in FIG. 5. There may be other mechanisms to identify whether a given subscriber is a ported-out subscriber and the examples shall not be seen as limiting.

The information query unit 202 receives the result of the MNP check e.g. from the FNR 104. The result of the information query, so information whether the recipient B is a ported-out subscriber is passed back to the processing unit 200.

The selecting step may be realized by a look-up table. The look-up table 204 is holding information about possible points of interconnect 107, 108, their geographical location, and the related network operator. The look-up table 204 performs a look-up on request from the processing unit 200, and the processing unit 200 provides a network operator and a geographical location as input parameters.

The look-up table 204 stores a single POI per combination of second operator and geographical location. The look-up table 204 then selects one POI 107, 108 for the network operator and geographical location, provided by the processing unit 200.

The selected POI is returned to the processing unit 200.

The look-up table 204 may also be realized as a database which may also be external to the control node 103.

The information in the look-up table 204 may have been filled in by the first operator by using operation and maintenance means, or may have been filled in by automated POI discovery means.

Although this embodiment refers to a POI 107, 108 being closest to a geographical location, it should be understood that the term closest refers to the fact that the chosen POI 107, 108 is best suited for a particular geographical location. The use of the chosen POI 107, 108 for the communication call in question may lead to the least network resource usage, may go via the least number of switching points, may use transport links with the least transport cost, may cost the least termination fee, may result into the shortest distance in kilometers between the geographical location of the chosen POI 107, 108 and the geographical location of the recipient B with the user equipment 109, or any combination hereof.

Figure 3:
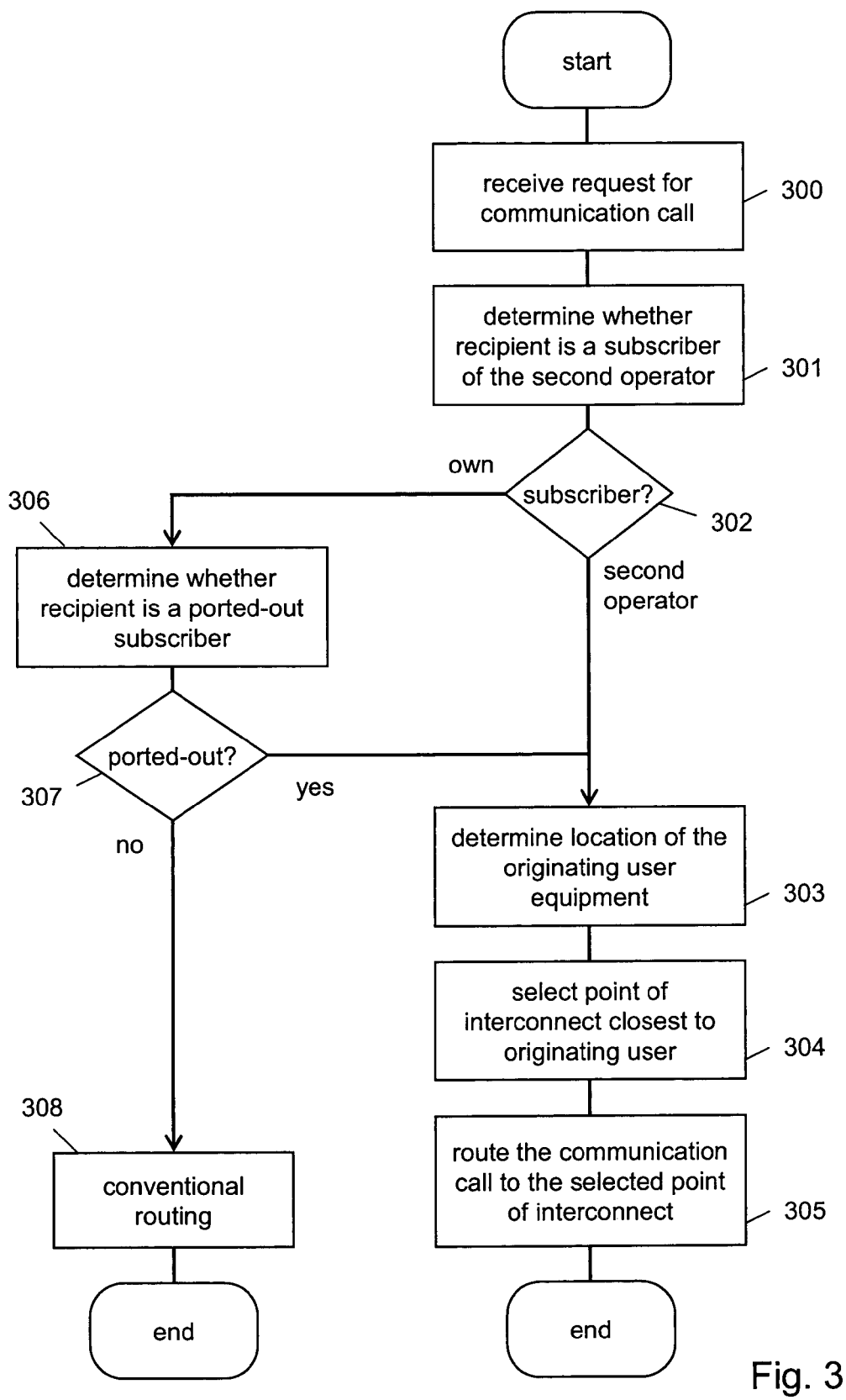
FIG. 3 shows a flow diagram of the steps performed by the method according to the invention.

FIG. 3 shows a flow diagram of the possible steps performed by the method.

The flow may start with the reception in 300 for a communication call, for example in a call control node like the one of FIG. 1. This request may be received e.g. in a receiving unit 201 of FIG. 2 along with information on the geographical location of the originating user equipment, which may be the user equipment 100 of FIG. 1.

The geographical information of the originating user equipment may for example be any of the following: a Location Number information element with the Location Number related to the originating user equipment, GPS coordinates, positioning measurements based on triangulation, a serving radio location area, a serving radio cell area, or any combination hereof.

The originating subscriber A with the originating user equipment may be roaming in a HNO in the same country as the first network operator, or may also roam in any visited network abroad. The setup request may be received via a signalling system used for setting up circuit switched communication calls. Examples for such signalling systems are ISUP, BICC, or SIP-I. The requested communication call may be a voice call, a data call, a multimedia call, or any combination thereof.

The setup request may also originate from a telecommunication system of a fixed network operator. Alternatively, the setup request may originate from a co-located MSC, in case the control node comprises a co-located MSC, which is described in further detail in FIG. 4.

In the next step the processing unit may determine in 301 whether the recipient is an own subscriber or a subscriber of the second network operator. The check may be done by a processing unit like the processing unit 200 or may also involve an additional support unit such as a number analysis unit, e.g. the unit 205 of FIG. 2.

The check performs an analysis on the recipient B address, e.g. the terminating user equipment 109 of FIG. 1, which may be in the format of an E.164 number or a SIP URI and uniquely identify the recipient B and the second network operator serving the recipient B. The analysis may be based on configuration by the first network operator provided by operation and maintenance means. The analysis steps performed depend on the format of the address and are well known for a person skilled in the art.

The analysis results in whether the recipient B is an own subscriber, or, if not, an identification of the second network operator. Branching in the flow may happen in 302, based on this result.

If it is determined that the recipient is a subscriber of the second network operator, the flow may continue with determining in 303 the geographical location of the originating user equipment. Based on the received information on the geographical location of the originating user equipment the processing unit may determine the geographical location of the originating user equipment.

Having determined the second operator and having determined the geographical location, the POI closest to the originating equipment may be selected in 304. The selecting step may be realized by a look-up table, e.g. a look-up table 204 of FIG. 2. The look-up table is holding information about possible points of interconnect, their geographical location, and the related network operator. The look-up table performs a look-up on request from the processing unit, and the processing unit provides a network operator and a geographical location as input parameters.

The look-up table stores a single POI per combination of second operator and geographical location. The look-up table then selects a single POI for the network operator and geographical location, provided by the processing unit.

The look-up table may also be realized as a database which may be internal or external to the call control node handling the request.

The information in the look-up table may have been filled in by the first operator by using operation and maintenance means, or may have been filled in by automated POI discovery means.

Although this embodiment refers to a POI 107, 108 being closest to a geographical location, it should be understood that the term closest refers to the fact that the chosen POI is best suited for a particular geographical location. The use of the chosen POI for the communication call in question may lead to the least network resource usage, may go via the least number of switching points, may use transport links with the least transport cost, may cost the least termination fee, may result into the shortest distance in kilometers between the geographical location of the chosen POI and the geographical location of the recipient B with the user equipment 109, or any combination hereof.

Then the communication call may be routed in 305 to the selected POI. Depending on what type of interconnection is available towards the selected POI of the second telecommunication system, different approaches are taken. The interconnection may consist of a direct route to the POI. In this case the routing may use direct route for further routing of the communication call.

It may also be the case that the interconnection is realized via a separate transit interconnection network provider. In this case the routing selects a route to the transit interconnection network provider.

In the case a separate transit interconnection network provider is used, before routing the communication call, a prefix may be added to the recipient B address. A prefix may be one or more digits that are placed in front of the received recipient B address when routing out the communication call. The prefix may be chosen depending on the selected POI. This prefix addresses uniquely identifies the selected POI of the second telecommunication system. When received at the POI, the added prefix may be removed as it is not needed anymore for the further routing of the communication call to the recipient B.

This branch of the flow ends after the routing step.

If it is determined in 302 that the recipient B is an own subscriber, conventional routing may be applied in 308. According to the embodiment of FIG. 3 it may optionally be determined in 306 and 307 whether the recipient B is a ported-out subscriber.

The ported-out check may be realized by an information query unit, like information query unit 202 of FIG. 2, which is adapted to obtain information whether a given subscriber is a ported-out subscriber from the first network operator to the second network operator. The information query unit performs an information query on request from the processing unit.

A mobile telephone user may use mobile number portability, MNP to retain his number when changing his subscription from the first operator to the second operator. In this case, the telecommunication system of the first network operator acts as a donor network, as that is porting-out one of its own numbers. The telecommunication system of the second operator acts a recipient network, as that receives the ported-out number.

Different implementation options exist to realize MNP. This example utilizes a flexible number register, FNR, like the FNR 104 of FIG. 1. The FNR may sit in the signalling path in-between the control node and the HLR. So when the control node acting for example as a GMSC interrogates the HLR for routing information, the FNR intercepts this query and identifies whether the destination subscriber is a ported-out subscriber.

Another option to realize a MNP check is to use IN or CAMEL mechanism, which is further described in FIG. 5. There may be other mechanisms to identify whether a given subscriber is a ported-out subscriber and the examples shall not be seen as limiting.

In 306, the information query unit receives the result of the MNP check from the FNR. In 307, if the recipient B is a ported-out subscriber, so the answer is yes, the flow may continue with the branch starting with step 303 as already described above.

In 307, if the recipient B is not a ported-out subscriber, so the answer is no, conventional terminating routing may be applied in 308, and this branch of the flow ends.

The above described flow diagram according FIG. 3 can be for example performed in the network as shown in FIG. 1, and, e.g., be executed by a node according to FIG. 2.

Figure 4:
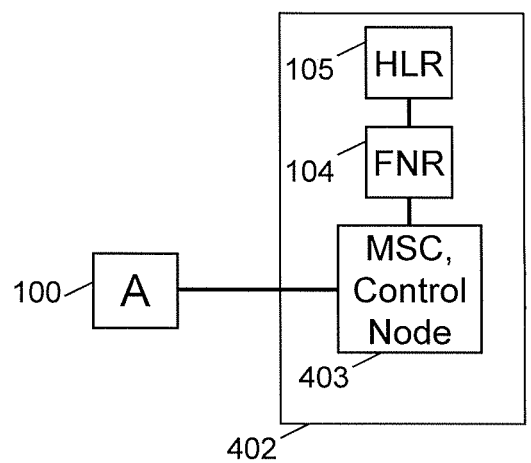
FIG. 4 shows a network scenario according to the invention comprising a control node with co-located MSC.

An alternative embodiment of the first telecommunication system 402 of a first network operator is shown in FIG. 4.

The telecommunication system 402 of the first network operator comprises at least one control node 403 with co-located MSC for controlling the routing of communication calls originating from, and terminating to the subscribers of the first operator, at least one home location register, HLR 105, a database holding the data of all subscribers of the first operator, and at least one flexible number register, FNR 104, holding the information of all subscribers ported-out from the first network operator to other network operators.

The telecommunication system 402 of the first network operator is interconnected with the telecommunication systems of other networks operators, for exemplification two interconnection links are shown.

In this alternative embodiment the originating user equipment 100 is connected directly via a radio access network, RAN, with the control node 403. Consequently the related network operator of such a telecommunication system 402 is not a MVNO, but a normal mobile network operator, MNO.

In case of a co-located MSC 403, also node internal radio cell information is available and the receiving unit 201 may be adapted to receive a setup request for a communication call from an originating subscriber A with the user originating equipment 100 and may be adapted to receive information on the geographical location of the originating user equipment 100 within this request based on radio cell information from that co-located MSC 403.

I shall be understood that the alternative embodiment of the first telecommunication system 402 comprises the same capabilities as the first telecommunication system 102 in FIG. 1 with respect to executing the method according to FIG. 3 and a possible internal node structure according to FIG. 2.

Yet another alternative embodiment of the first telecommunication system 102 of a first network operator is shown in FIG. 5.

The telecommunication system 502 of the first network operator comprises at least one control node 103 controlling the routing of communication calls. It further comprises a service control point, SCP 501 using IN or CAMEL means, holding the information of all subscribers ported-out from the first network operator to other network operators.

The telecommunication system 502 of the first network operator is interconnected with the telecommunication systems of other networks operators, for exemplification two interconnection links are shown.

As an equivalent alternative to the previously described FNR 104, also SCP 501 based on IN or CAMEL means can be used to determine whether a recipient B of a communication call is a ported-out subscriber.

In the IN or CAMEL alternative, a trigger detection point is armed in the control node 103. When during setup of the call this trigger detection point is triggered, the setup of the call is halted and a SCP 501 server node is queried for instructions on how to handle this call. The SCP 501 then identifies whether the destination subscriber is a ported-out subscriber. After that the control node 103 resumes the call setup.

As yet another embodiment variant, the control node 103 may comprise a co-located MSC as shown in 403.

It shall be understood that the alternative embodiment of the first telecommunication system 502 comprises the same capabilities as the first telecommunication system 102 in FIG. 1 with respect to executing the method according to FIG. 3 and a possible internal node structure according to FIG. 2.

Clearly, several modifications will be apparent to and can be readily made by the skilled in the art without departing from the scope of the present invention. Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by the skilled in the art.

The invention claimed is:

1. A method for routing a communication call from a first telecommunication system of a first network operator to a second telecommunication system of a second network operator;
   the first telecommunication system and the second telecommunication system being interconnected via at least two points of interconnect; POI, physically distant from each other;

the method comprising the steps of:
receiving at the first telecommunication system a setup request associated with the communication call from an originating user equipment;
determining whether a recipient of the communication call is a subscriber of the second network operator;
and if so, determining a geographical location of the originating user equipment;
selecting a POI being closest to the geographical location of the originating user equipment; and
routing the communication call from the first telecommunication system to the selected POI of the second telecommunication system.

2. The method of claim 1, wherein the setup request associated with the communication call is received via a signaling used for setting up a circuit switched call.

3. The method of claim 1, wherein the setup request associated with the communication call is received from a third telecommunication system of a third network operator.

4. The method of claim 1, wherein the determining whether the recipient of the communication call s a subscriber of the second network operator is based on analyzing the destination address received with the setup request.

5. The method of claim 4, wherein, if the result of the destination address analysis is that the recipient is an own subscriber, the method further comprises determining whether the recipient is a subscriber ported-out from the first network operator to the second network operator based on a mobile number portability, MNP.

6. The method of claim 5, wherein the determining whether the recipient of the communication call is a ported-out subscriber is based on a flexible number register, FNR.

7. The method of claim 5, wherein the determining whether the recipient of the communication call is a ported-out subscriber is based on an intelligent network, IN, or a customized application for mobile network enhanced logic, CAMEL.

8. The method of claim 1, wherein the determining a geographical location of the originating user equipment is based on geographical information received with the setup request.

9. The method of claim 1, wherein the selecting of the POI is based on a look-up table.

10. The method of claim 1, wherein the routing of the communication setup request is based on adding a prefix to the received destination address.

11. The method of claim 10, wherein the first and the second telecommunication system are interconnected via a fourth telecommunication system of a fourth network operator.

12. The method of claim 1, wherein the routing of the communication setup request is based on selecting a dedicated route towards the POI.

13. A control node for routing a communication call from a first telecommunication system of a first network operator to a second telecommunication system of a second network operator;
the first telecommunication system and the second telecommunication system being interconnected via at least two points of interconnect, POI, physically distant from each other;
the control node comprising:
a receiving unit configured to receive a setup request associated with the communication call from an originating user equipment, and configured to receive information on the geographical location of the originating user equipment within this setup request;
at least one processing unit configured to determine whether a recipient of the communication call is a subscriber of the second network operator, configured to determine a geographical location of the originating user equipment based on the obtained information on the geographical location, and configured to select a POI being closest to the geographical location of the originating user equipment, and
a routing unit configured to route the communication call from the first telecommunication system to the selected POI of the second telecommunication system.

14. The control node of claim 13, further comprising a number analysis unit configured to determine whether the recipient of the communication call is a subscriber of the second operator by analyzing the destination address received with the setup request.

15. The control node of claim 13, further comprising an information query unit configured to obtain information on whether a recipient of the communication call is a ported-out subscriber from the first network operator to the second network operator.

16. The control node of claim 15, wherein the information query unit comprises an interface to a flexible number register, FNR, and is configured to obtain information by interrogating the FNR.

17. The control node of claim 15, wherein the information query unit comprises an interface to a service control point, SCP, associated with an intelligent network, IN, or a customized application for mobile network enhanced logic, CAMEL, and is configured to obtain information by interrogating the SCP.

18. The control node of claim 13, comprising a co-located Mobile Switching Centre, MSC, and a processing unit configured to obtain a geographical location of the originating user equipment based on radio cell information available from the co-located MSC.

19. The control node of claim 13, comprising a look-up table holding information about possible POIs, their geographical location, and the related network operator.

* * * * *